(12) United States Patent
Mühlhofer et al.

(10) Patent No.: US 6,322,765 B1
(45) Date of Patent: Nov. 27, 2001

(54) PROCESS FOR PREPARING SILICON DIOXIDE

(75) Inventors: Ernst Mühlhofer, Sulzberg im Allgäu; Carl-Heinz Ehrke, Tuessling; Gerhard Kalchgruber, Haiming; Botho Druse, Burghausen, all of (DE)

(73) Assignee: Wacker-Chemie GmbH, München (DE)

( * ) Notice: Subject to any disclaimer, the term of this patent is extended or adjusted under 35 U.S.C. 154(b) by 0 days.

(21) Appl. No.: 09/149,651

(22) Filed: Sep. 8, 1998

Related U.S. Application Data

(63) Continuation of application No. 08/799,557, filed on Feb. 10, 1997.

(30) Foreign Application Priority Data

Feb. 15, 1996 (DE) .............................. 196 05 672
Sep. 7, 2000 (KR) ...................... 10-2000-53216

(51) Int. Cl.[7] .................................................. C01B 33/12
(52) U.S. Cl. .................................................. 423/336
(58) Field of Search .............................. 423/336

(56) References Cited

U.S. PATENT DOCUMENTS

| 3,560,151 | 2/1971 | Vogt et al. . |
|---|---|---|
| 4,108,964 | 8/1978 | Kratel et al. . |
| 5,340,560 | 8/1994 | Rohr et al. . |

FOREIGN PATENT DOCUMENTS

| 26 20 737 | 12/1977 | (DE) . |
|---|---|---|
| 29 09 815 | 9/1980 | (DE) . |
| 37 12 125 | 10/1988 | (DE) . |
| 0 634 360 | 7/1994 | (EP) . |
| 0 706 972 | 10/1995 | (EP) . |
| 2 351 052 | 12/1977 | (FR) . |
| 2 451 343 | 10/1980 | (FR) . |
| 796735 | 6/1958 | (GB) . |
| 1 199 280 | 7/1970 | (GB) . |
| 2 049 641 | 12/1980 | (GB) . |
| 58-140313 | 8/1983 | (JP) . |
| 60-11218 | 1/1985 | (JP) . |
| 1742208 | 6/1992 | (SU) . |
| WO 90/10596 | 9/1990 | (WO) . |

OTHER PUBLICATIONS

Derwent Abstract, AN 77–81189Y [46] for DE 2620737A Kratel (Dec. 1, 1977).

Derwent Abstract, AN 80–67941C [39] for DE 2909815A Kratel (Sep. 18, 1980).

Derwent Abstract, AN 88–300624 (43) for DE 3712125A (Oct. 20, 1988).

Derwent Abstract, AN 95–044481 [07] for EP 634360 (Jan. 18, 1995).

*Primary Examiner*—Paul Marcantoni
(74) *Attorney, Agent, or Firm*—Brooks & Kushman P.C.

(57) ABSTRACT

The invention relates to a process for preparing highly disperse silicon dioxide by combustion of organochlorosilicon compounds, which comprises transporting a liquid which contains at least one hydrocarbon compound and at least one organochlorosilicon compound into a burner and burning the liquid there in the presence of an oxygen-containing gas and without supply of water.

18 Claims, No Drawings

PROCESS FOR PREPARING SILICON DIOXIDE

This is a continuation of copending application Ser. No. 08/799,557 filed on Feb. 10, 1997.

BACKGROUND OF THE INVENTION

The present invention relates to a process for preparing highly disperse silicon dioxide by combustion of organochlorosilicon compounds.

DE-26 20 737 C2 describes a process by which highly disperse silicon dioxide of high chemical purity can be prepared by combustion of organochlorosilane compounds in the presence of atmospheric oxygen and a burnable gas. The organochlorosilanes used are present in the form of a vaporizable liquid which consists of one or more of the pure organosilane compounds. Use of liquids which, in addition to an organochlorosilane compound, also contain hydrocarbons, is not described in the patent. A use of this type is also not obvious, since according to the patent "with organosilanes, generally, only dark, carbon-contaminated products are achieved". For the combustion process, the liquid is vaporized and the vapor is mixed with the remaining gases which participate in the combustion.

According to DE-A-29 09 815, it is also possible to burn gaseous or vaporizable silicon compounds, which could not be supplied to any economical use, to give highly disperse silicon dioxide. As an example, hydrocarbon-containing by-products are mentioned which arise as first runnings and tailings in the separation by distillation of the products from the reaction of silicon or silicon alloys with organic halides or hydrogen chloride. The addition of a combustible gas is omitted in the combustion and, instead, steam is fed to the gas mixture intended for combustion. However, it has turned out that this process is scarcely suitable for industrial use, because some of the organochlorosilane prematurely reacts with steam to form hydrolyzed silicic acid, which in a short time plugs the feed tube to the combustion chamber and its removal is associated with considerable safety problems.

BRIEF SUMMARY OF THE INVENTION

The object of the present invention is to find a satisfactory solution in order to prepare industrially utilizable, highly disperse silicon dioxide from hydrocarbon-containing by-products of chlorosilane syntheses.

DETAILED DESCRIPTION OF THE INVENTION

The object of the present invention is achieved by a process for preparing highly disperse silicon dioxide by combustion of organochlorosilicon compounds, which comprises transporting a liquid which contains at least one hydrocarbon compound and at least one organochlorosilicon compound into a burner and burning the liquid there in the presence of an oxygen-containing gas and without supply of water.

By-products of chlorosilane syntheses arise in large amounts in the purification by distillation of the target products as low-boiling first runnings and high-boiling tailings and are predominantly either hydrolyzed and landfilled or burnt in a refuse incineration plant, the incineration residues then have to be landfilled. The present invention opens up a potential economic use for these by-products.

A particular advantage of the process of the invention results from the tailings and the first runnings, and any mixtures of tailings and first runings, being able to be used for preparing highly disperse silicon dioxide. These are generally liquids which contain various hydrocarbons and organochlorosilanes, and possibly chlorosilanes, chlorosiloxanes, organochlorosiloxanes, organosilanes and organosiloxanes. However, to carry out the invention, it is necessary that a liquid is used which contains at least one hydrocarbon compound and at least one organochlorosilicon compound.

Organochlorosilicon compounds which can be used are preferably compounds which have one of the three formulae specified below:

a) $R_nSiCl_{4-n}$, where n is an integer from 1 to 3;
b) $R_nCl_{3-n}SiSiR_mCl_{3-m}$, where n is an integer from 0 to 3 and m is an integer from 0 to 3, and m = n = 0 or m = n = 3 being excluded;
c) $R_nCl_{3-n}SiOSiR_mCl_m$, where n is an integer from 0 to 3 and m is an integer from 0 to 3, and m = n = 0 or m = n = 3 being excluded.

In the formulae,

R is a hydrogen or an aliphatic or aromatic hydrocarbon radical, preferably a radical selected from the group consisting of hydrogen, methyl, ethyl, propyl, vinyl, isooctyl and phenyl radicals.

The content of the hydrocarbon compound in the liquid can be up to 30% by weight.

According to a first embodiment of the invention, which is preferably used in the case of organochlorosilicon compound-containing liquids having a boiling range from 130 to 180° C., the liquid is vaporized in a vaporizer and the vapor produced is mixed with an oxygen-containing gas and, optionally, with hydrogen, methane, propane or another gas which burns in the presence of oxygen with the formation of water, and burnt in a burner. The addition of water is omitted. The liquid is vaporized at a controlled filling level of the vaporizer at a constantly maintained vapor pressure and at a constantly maintained vapor temperature. The heat produced in the vaporization is removed by forced cooling. The temperature of the vapor produced should, on entry into the burner, should be at or above, the boiling point of the liquid. It is expedient to preheat the gases which are admixed to the organochlorosilicon compound-containing vapor prior to combustion to the extent that condensation of the vapor is excluded. As oxygen-containing gases in the context of the invention, gases are suitable which contain molecular oxygen in a proportion of at least 15% by volume, in particular oxygen and air. There is beneficial effects on the quality of the silicon dioxide produced if the organochlorosilicon compound-containing vapor and the oxygen-containing gas are mixed prior to combustion, for example in a mixing section furnished with special internals. The oxygen-containing gas should be carefully dried before it is admixed to the organochlorosilicon compound-containing vapor. This prevents the formation of an interfering deposit in the gas feedlines to the burner and in the area of the burner nozzle.

The gas mixture is burnt as described in DE-26 20 737 C2, using a burner with forced cooling and a conical outlet orifice and ring flushing nozzle.

The silicon dioxide obtained as product has a high BET surface area of from 50 to 500 $m^2/g$ and is free from coloring impurities.

According to a second embodiment of the invention, which can be used when the boiling range of the liquid is above 130° C., the liquid is injected through a nozzle into a burner and simultaneously the oxygen-containing gas, and, optionally, a gas which burns in the presence of oxygen with the formation of water, are fed to the burner. This procedure has the advantage that liquids which are not vaporizable or have only low volatility can also be used.

For metering of the components to be burnt, a control loop is established. The measured residual oxygen content in the flue gas is used as the control variable. If the measured value deviates from a preset tolerance range, the mixing ratio "organochlorosilicon compound-hydrocarbon starting material/oxygen-containing gas/gas burning with the formation of water" is changed until the measured value is again within the tolerance range. This ensures that the process delivers silicon dioxide of constant product quality. A further development of the process additionally provides for determining the concentration ratio "silane compounds/hydrocarbons" in the liquid and, optionally, changing it by addition of further hydrocarbons or organochlorosilicon compound-containing residues. The aim of this conditioning of the starting material is the maintenance of a constant product quality.

EXAMPLE 1

An amount of 21 t of the vapor (operating pressure 1.8 bar) of an organochlorosilicon compound-containing mixture boiling at about 130° C. was burnt by the process of the invention in the presence of air and hydrogen in a burner disclosed by patent DE-26 20 737 C2 to give highly disperse silicon dioxide. The liquid mixture was the tailings of the distillation of products of chlorosilane syntheses. The liquid had the following composition:

55% by weight of $CH_3HSiCl_2$

5% by weight of a mixture of $CH_3SiCl_3$ and $(CH_3)_2SiCl_2$

30% by weight of a mixture of trimethyl- and dimethyl-chlorodisilanes. The remainder was hydrocarbons, various other organosilanes and organosiloxanes.

In the combustion of 235 kg/h of the vapor in the presence of 1480 m³ (S.T.P.)/h of air and 100 m³ (S.T.P.)/h of hydrogen, silicon dioxide was formed having a BET surface area of 370 m²/g.

EXAMPLE 2

In a further experiment, a liquid containing organochlorosilicon compounds and hydrocarbons was used which boiled at about 120° C. and had been produced by mixing the first runnings and the tailings of a distillation of products of chlorosilane syntheses. The mixture contained, from 5% to 15% by weight, $(CH_3)_4Si$, $(CH_3)_2HSiCl$, $HSiCl_3$, $(CH_3)_3SiCl$, $SiCl_4$, $(CH_3)_2SiCl_2$, $CH_3SiCl_3$, $CH_3C_2H_5SiCl_2$, disilanes having the formula $R_nCl_{3-n}SiSiR_mCl_{3-m}$, where R were methyl radicals and the total n+m was an integer from 2 to 6 and about 15% by weight of hydrocarbons and various other silane compounds. The pressure of the vapor produced was 1.8 bar.

When a mixture of 165 kg/h of the vapor produced by vaporizing the liquid was burnt in the presence of 1490 m³ (S.T.P.)/h of air and 150 m³ (S.T.P.)/h of hydrogen, silicon dioxide having a BET surface area of 230 m²/g was formed.

EXAMPLE 3

In a further experiment, combustion was performed under the same conditions as in Example 1, with the difference that $CH_3HSiCl_2$ was replaced by $CH_3SiCl_3$ in the liquid.

When a mixture of 600 kg/h of the vapor produced by vaporizing the liquid was burnt in the presence of 1600 m³ (S.T.P.)/h of air and 200 m³ (S.T.P.)/h of hydrogen, silicon dioxide having a BET surface area of 191 m²/g was formed.

What is claimed is:

1. A process for preparing highly disperse silicon dioxide by combustion of organosilicon compounds, comprising: introducing a silicon-containing liquid into a burner, said silicon-containing liquid comprising an organochlorosilicon-containing fraction derived from processing of chlorosilanes, said silicon-containing liquid also containing a hydrocarbon fraction derived from said processing of chlorosilanes, and burning said silicon-containing liquid in said burner in the presence of an oxygen-containing gas without the addition of water, and recovering a highly disperse silicon dioxide product free from coloring impurities.

2. The process as claimed in claim 1, wherein the liquid is vaporized outside the burner and the resulting vapor is introduced into the burner.

3. The process as claimed in claim 1, wherein the liquid is injected through a nozzle into the burner.

4. The process as claimed in claim 1, wherein the oxygen-containing gas is dried and preheated before it is fed into the burner.

5. The process as claimed in claim 1, wherein a gas which burns in the presence of oxygen with the formation of water is additionally fed to the burner.

6. A process for preparing highly disperse silicon dioxide, said process comprising:
    a) selecting as a silicon dioxide-generating, silicon-containing feed stream a feed stream containing organochlorosilicon compounds and a hydrocarbon fraction, said feed stream derived from low-boiling front runnings from purification of organochlorosilanes produced by reaction of organochlorides and silicon metal, said feed stream having a boiling point at standard temperature and pressure of from about 130° C. to about 180° C.;
    b) vaporizing said feed stream;
    c) combusting said vaporized feed stream with an oxygen-containing gas in a burner without the addition of water;
    d) recovering highly disperse silicon dioxide.

7. The process of claim 6 wherein a combustible gas is additionally supplied to said burner.

8. The process of claim 6 wherein said organochlorosilicon compound comprises one or more compounds selected from the group consisting of:
    i) $R_nSiCl_{4-n}$, where n is an integer from 1 to 3;
    ii) $R_nCl_{3-n}SiSiR_mCl_{3-m}$, where n is an integer from 0 to 3 and m is an integer from 0 to 3, and m=n=0 and m=n=3 are excluded; and
    iii) $R_nCl_{3-n}SiOSiR_mCl_{3-m}$, where n is an integer from 0 to 3 and m is an integer from 0 to 3, and m=n=0 and m=n=3 are excluded;

wherein R is hydrogen or an aliphatic or aromatic hydrocarbon radical.

9. The process of claim 8 wherein said aliphatic or aromatic hydrocarbon radicals are selected from the group consisting of hydrogen, methyl, ethyl, propyl, vinyl, isooctyl and phenyl radicals.

10. The process of claim 8 wherein said feed stream contains organochlorosiloxanes iii).

11. The process of claim 6 wherein said oxygen-containing gas comprises dry air.

12. The process of claim 6 wherein said feed stream further comprises high boiling tailings.

13. A process for preparing highly disperse silicon dioxide, said process comprising:
   a) selecting as a silicon dioxide-generating, silicon-containing feed stream a feed stream containing organochlorosilicon compounds and a hydrocarbon fraction, said feed stream derived from high boiling tailings from purification of organochlorosilanes produced by reaction of organochlorides and silicon metal, said feed stream having a boiling point at standard temperature and pressure above about 180° C.;
   b) supplying said feed stream in liquid form to a burner,
   c) combusting said liquid feed stream with an oxygen-containing gas in said burner without the addition of water;
   d) recovering highly disperse silicon dioxide product free from coloring impurities.

14. The process of claim 13 wherein a combustible gas is additionally supplied to said burner.

15. The process of claim 13 wherein said oxygen-containing gas comprises dry air.

16. The process of claim 13 wherein said feed stream further comprises low boiling front runnings.

17. The process of claim 16 wherein said feed stream comprises one or more compounds selected from the group consisting of:
   i) $R_n SiCl_{4-n}$, where n is an integer from 1 to 3;
   ii) $R_n Cl_{3-n} SiSiR_m Cl_{3-m}$, where n is an integer from 0 to 3 and m is an integer from 0 to 3, and m=n=0 and m=n=3 are excluded;
   iii) $R_n Cl_{3-n} SiOSiR_m Cl_{3-m}$, where n is an integer from 0 to 3 and m is an integer from 0 to 3, and m=n=0 and m=n=3 are excluded;
wherein R is a hydrogen or an aliphatic or aromatic hydrocarbon radical.

18. The process of claim 17 wherein said aliphatic or aromatic hydrocarbon radical is selected from the group consisting of hydrogen, methyl, ethyl, propyl, vinyl, isooctyl and phenyl radicals.

* * * * *